United States Patent
Nitzpon et al.

(10) Patent No.: US 7,834,476 B2
(45) Date of Patent: Nov. 16, 2010

(54) METHOD FOR RUNNING IN A DRIVE TRAIN COMPONENT OF A WIND ENERGY PLANT AND WIND ENERGY PLANT FOR EXECUTING THIS METHOD

(75) Inventors: Joachim Nitzpon, Hamburg (DE); Hauke Karstens, Hamburg (DE); Ulrich Harms, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 363 days.

(21) Appl. No.: 11/867,777

(22) Filed: Oct. 5, 2007

(65) Prior Publication Data

US 2009/0005909 A1 Jan. 1, 2009

(30) Foreign Application Priority Data

Jun. 30, 2007 (DE) .................. 10 2007 030 501

(51) Int. Cl.
| | |
|---|---|
| *F03D 9/00* | (2006.01) |
| *F03D 7/02* | (2006.01) |
| *H02P 9/04* | (2006.01) |
| *F04D 27/02* | (2006.01) |
| *B64C 11/00* | (2006.01) |
| *B64C 27/00* | (2006.01) |
| *B63H 7/00* | (2006.01) |
| *G05B 13/02* | (2006.01) |
| *G05D 3/12* | (2006.01) |
| *G05D 17/00* | (2006.01) |

(52) U.S. Cl. ................. 290/55; 290/44; 415/1; 416/1; 416/37; 416/41; 416/171; 700/33; 700/287

(58) Field of Classification Search ............ 700/22, 700/28, 32–34, 275, 286–290, 299, 297; 290/1 A, 1 C, 1 D, 4 C, 44, 55; 415/1, 2.1, 415/146, 905; 416/1, 6, 36, 37, 40, 41, 170 R, 416/171; 702/41
See application file for complete search history.

(56) References Cited

U.S. PATENT DOCUMENTS

| 3,161,181 A | | 12/1964 | Weise | |
|---|---|---|---|---|
| 4,029,434 A | * | 6/1977 | Kenney | ............... 416/41 |
| 4,150,301 A | * | 4/1979 | Bergey, Jr. | ............... 290/44 |

(Continued)

FOREIGN PATENT DOCUMENTS

FR 716452 12/1931

(Continued)

OTHER PUBLICATIONS

"Engine Break In" by D. Kwik.

*Primary Examiner*—Crystal J Barnes-Bullock
(74) *Attorney, Agent, or Firm*—Vidas, Arrett & Steinkraus

(57) ABSTRACT

A method for running in a drive train component of a wind energy plant, wherein the wind energy plant has an operation management which can control at least one operational variable B significant for the strain of the drive train component to a desired value $B_S$, wherein after starting up the drive train component, the desired value $B_S$ is limited by a maximum value $B_{Max}$, which is preset depending on a yield value W which describes the yield of the wind energy plant achieved since starting up the drive train component.

28 Claims, 2 Drawing Sheets

U.S. PATENT DOCUMENTS

| | | | |
|---|---|---|---|
| 4,297,075 A * | 10/1981 | Jacobs et al. | 416/14 |
| 4,857,753 A * | 8/1989 | Mewburn-Crook et al. | 290/55 |
| 7,081,689 B2 * | 7/2006 | Tilscher et al. | 290/44 |
| 7,345,373 B2 * | 3/2008 | Delmerico et al. | 290/44 |
| 7,571,013 B2 * | 8/2009 | Altemark | 700/34 |
| 7,638,894 B2 * | 12/2009 | Stommel | 290/55 |
| 7,761,190 B2 * | 7/2010 | Delmerico et al. | 700/297 |
| 2007/0297892 A1 * | 12/2007 | Kildegaard | 415/1 |
| 2009/0273187 A1 * | 11/2009 | Gertmar et al. | 290/44 |
| 2009/0319199 A1 * | 12/2009 | Volkmer | 702/41 |

FOREIGN PATENT DOCUMENTS

| | | |
|---|---|---|
| FR | 1065354 | 5/1954 |
| JP | 2007071196 A * | 3/2007 |

* cited by examiner

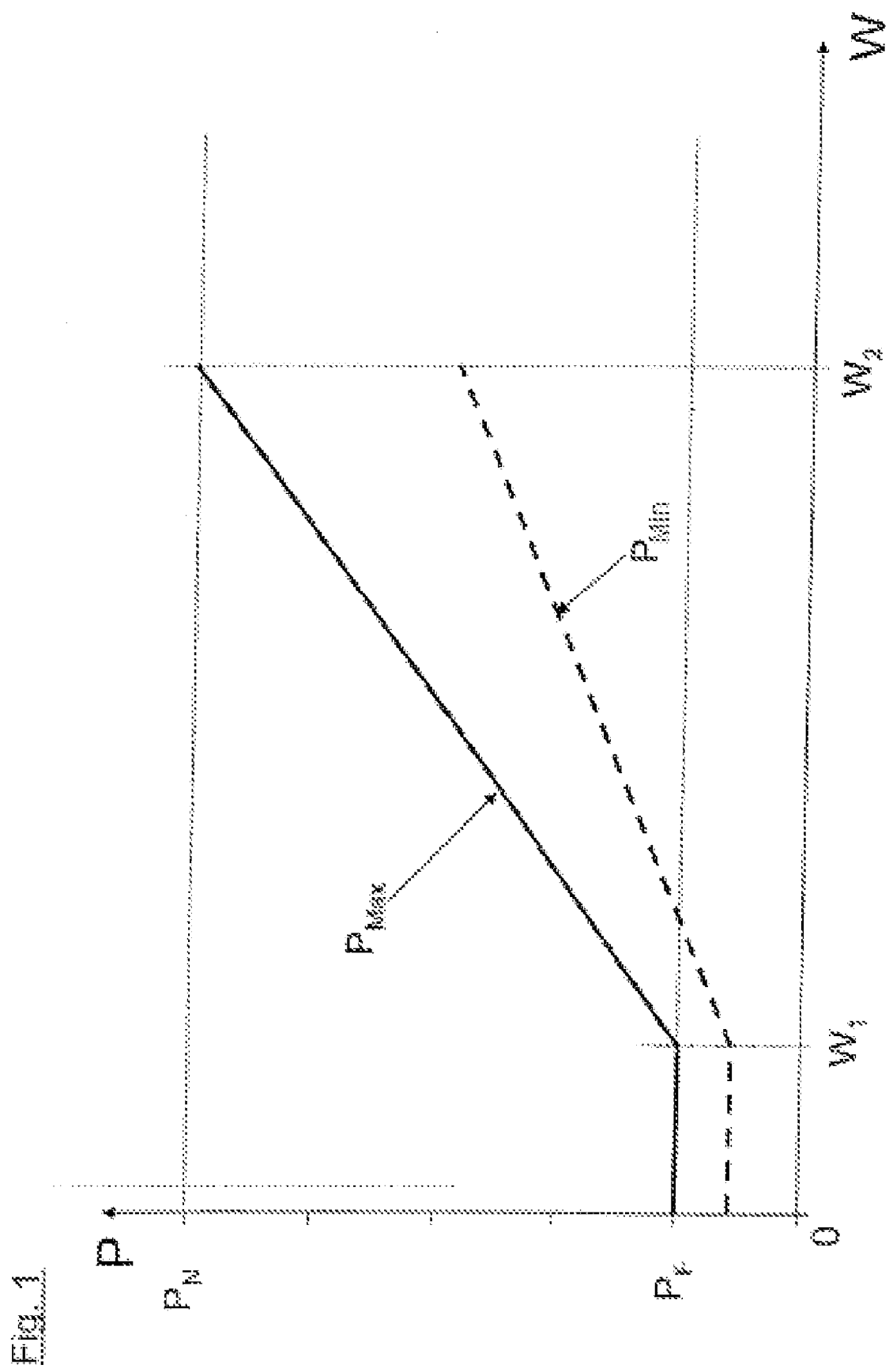

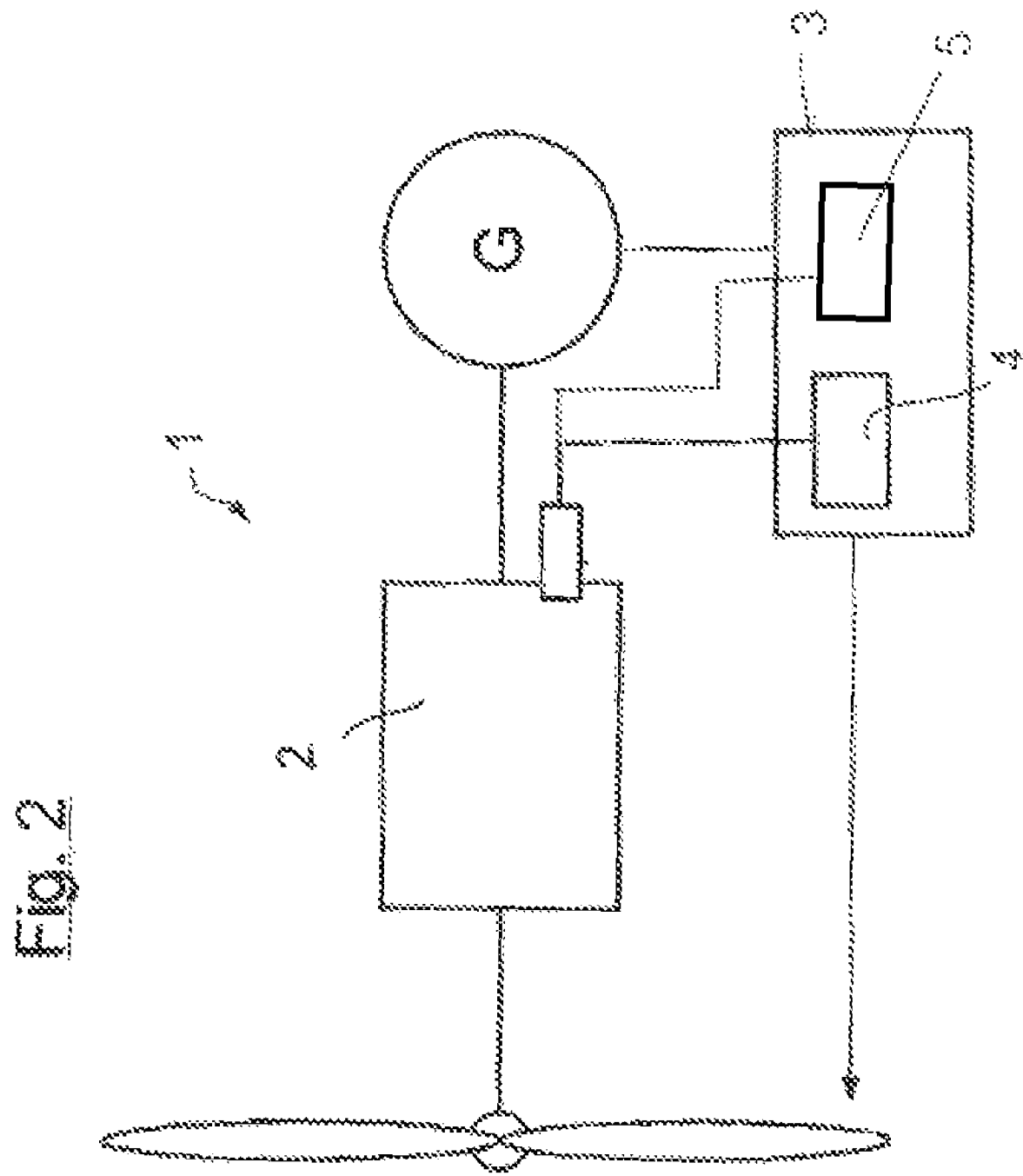

METHOD FOR RUNNING IN A DRIVE TRAIN COMPONENT OF A WIND ENERGY PLANT AND WIND ENERGY PLANT FOR EXECUTING THIS METHOD

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for running in a drive train component of a wind energy plant and a wind energy plant which can execute this method.

The drive train of a wind energy plant transmits the torque of a rotor of the wind energy plant, which is driven by the wind, to a generator which provides electric energy. In the case of a directly driven generator, the same can be immediately connected to the rotor via a shaft. However, in the most frequent construction, the generator is operated at a rotational speed which is substantially higher than that of the rotor, so that a step-down gearbox is needed in the drive train. Such gearboxes are normally realised with two or three steps and have a number of gearings in engagement with each other. All the components of such a drive train are exposed to high mechanical strains, the gearings of the gearbox in particular are strongly strained by the high torques of the rotor. As a consequence, in spite of the intense efforts of the manufacturers of wind energy plants and gearboxes, respectively, damages in the drive train region occur always again, which can lead to the breakdown of the wind energy plant The high strains lead also to a limited lifetime of individual drive train components, which can make a replacement of the components necessary, as the case may be. Such a replacement is accompanied by a high expense of money and time and leads to an unwanted failure of the wind energy plant.

Based on this, it is the objective of the present invention to indicate a method which permits a particularly gentle operation of a drive train component of a wind energy plant and which promotes a long lifetime of the drive train component, as well as a wind energy plant which can execute the method.

BRIEF SUMMARY OF THE INVENTION

The method of the present invention serves for running in a drive train component of a wind energy plant, wherein the wind energy plant has an operation management which can control at least one operational variable B significant for the strain of the drive train component to a desired value $B_S$, wherein after starting up the drive train component, the desired value $B_S$ is limited by a maximum value $B_{Max}$, which is preset depending on a yield value W which describes the yield of the wind energy plant achieved since starting up the drive train component.

When running in a drive train component, the same is operated under particular boundary conditions within a certain period of time after starting up the drive train component, with a reduced or particularly uniform load, for instance.

The present invention is based on the finding that the obtainable lifetime of a drive train component can be prolonged through the gentle start-up of new drive train components in particular. Therefore, a purposeful running in of the drive train component is proposed, which may be a matter of running in a completely new wind energy plant as well as running in a drive train component which has been built in into an existing wind energy plant, as a replacement part, for instance. The drive train component can be a gearbox, a gearbox step, an individual toothed wheel or a bearing, for instance.

The operational variable B significant for the strain of the drive train component may be any arbitrary operational variable, which has a substantial influence on the strain of the drive train component.

The desired value $B_S$ to which the operation management of the wind energy plant controls the operational variable B significant for the strain of the drive train component may be preset by the operation management itself on the basis of the prevailing wind speed or externally, by a wind park control for instance.

During running in the drive train component, the desired value $B_S$ receives an upper limit through a maximum value $B_{Max}$. The presetting of the maximum value $B_{Max}$ takes place depending on a yield value W. The yield value W is a mathematical operand which describes the yield of the wind energy plant achieved since starting up the drive train component. It may correspond to the yield actually achieved by the wind energy plant since starting up the drive train component in the meaning of an electric energy, measured in kWh, or it may be based in a complicated way on this achieved yield or variables linked to this achieved yield, like measurement variables serving as the basis of the yield. The dependency of the maximum value $B_{Max}$ from the yield value W can be deposited as a functional relationship in the wind energy plant, preferably in the operation management thereof, or in the form of a look-up table, which associates one maximum value $B_{Max}$ to each yield value W.

This procedure results in a limitation of the mechanical strain of the drive train component, which depends on the strain accumulated since starting up the drive train component The strains actually acting on the drive train component are limited by this, such that a particularly good matching of surfaces being in engagement, like the frictional pairings in the bearings and on the tooth faces, and a particularly gentle, continuous running in is achieved. The method of the present invention is advantageous in particular in order to smooth gearings and to ascertain the reliability thereof. An overstrain of the tooth faces when starting up is effectively prevented. Through this, the obtainable lifespan of the drive train component is prolonged.

In one embodiment, the operational variable B significant for the strain of the drive train component is the electric power generated by the wind energy plant. The electric power generated by the wind energy plant has a direct influence on the strain of the drive train component. The electric power can be a matter of effective power, a reactive power or an apparent power, for instance. The control to the desired value $B_S$ through the operation management can take place in a known way by presetting a generator moment or a corresponding blade pitch adjustment in the case of controlling the electric power.

In one embodiment, the operational variable B significant for the strain of the drive train component is a torque in the drive train of the wind energy plant. The torque transmitted by the drive train is an operational variable which has a direct influence on the strain of the drive train component. The torque can be established or measured on any arbitrary component of the drive train. Preferably, the measurement of the torque takes place on the driven shaft of the gearbox. The torque existing there can be controlled by presetting a generator torque in particular.

In one embodiment, the maximum value $B_{Max}$ is steadily increased after starting up, until it reaches a rated value $B_N$ of the operational variable B of the wind energy plant significant for the strain of the drive train component at a certain yield value $W_2$. Through this, the maximum strain acting on the drive train component is also continuously increased, which results in a particularly effective running in. In a further embodiment, the running in procedure is stopped when a certain yield value is reached and there is no more limitation through the maximum value $B_{Max}$. The established yield value can be $W_2$. Thereafter, the wind energy plant is in the normal operation.

In a further embodiment, the maximum value $B_{Max}$ has an initial value $B_F$ when the drive train component is started up. Thus, there is no limitation of the desired value $B_S$ to values below the minimum value preset by the initial value $B_F$. As a consequence, a minimum strain of the drive train component corresponding to this initial value $B_F$ is permitted, beginning with the start-up of the drive train component. Through this, an excessive limitation of the operational variable is avoided.

According to a further embodiment, the maximum value $B_{Max}$ is kept constant up to a presettable yield value $W_1$ after starting up the drive train component. Thus, in a period of time up to reaching the yield value $W_1$, no increase of the upper strain limit is performed. Through this it is ascertained that the strain of the drive train component is increased only after a certain strain duration and strain amount which is necessary for the first running in.

In a further embodiment, the maximum value $B_{Max}$ is preset to be proportional to the yield value W in a period. Thus, there is a linear increase of the maximum value $B_{Max}$ depending on the yield value W. This corresponds to a uniform, continuous reduction of the strain limitation with increasing yield value W. A uniform increase of the permissible strain of the drive train component is achieved by doing so.

In a further embodiment, the maximum value $B_{Max}$ is preset to be proportional to a root of the yield value W in a period. Preferably, it is matter of the square root in the root function, but another root function may be selected, however. This realisation is based on the consideration that the occurring strains of the drive train component depend on the momentary value of the operational variable B, from the power of the wind energy plant in particular, wherein certain surface portions of the drive train component are predominantly strained at a predetermined power. At the same time, the power flows linearly into the achieved yield, i.e. at high power, a certain yield interval is passed in a shorter time than at small power. When the power limitation is reduced proportional to a root of the yield value during running in, every strain level is maintained for an approximately equal time duration. As a consequence, a particularly uniform running in of all surface portions of the drive train component is achieved.

According to a further embodiment, the maximum value $B_{Max}$ is preset to be proportional to the yield value W between the yield values $W_1$ and $W_2$. Thus, the period of uniform strain limitation reduction fills in the same time interval between the two yield values $W_1$ and $W_2$.

In a further embodiment, the yield value W is established by cumulation of the achieved yields of the wind energy plant since the drive train component was started up. In this, the yields achieved in one time interval can be calculated by multiplying the average electric power P generated in the time interval by the time duration of the interval. These yields are summed up in order to preset the yield value at a certain point in time. Through this, it is obtained that the yield value W reflects at any time the strain duration and strain amount of the drive train component since it has been started up.

According to a further embodiment, in the cumulation of the achieved yields only those yields are taken into account which have been achieved at a momentary or average value of the operational variable B significant for the strain of the drive train component above a minimum value The minimum value $B_{Min}$ defines a lower threshold of the operational variable B which leads to a strain of the drive train component which is relevant for running in. When the wind energy plant is operated at very low strains below the minimum value, this does not lead to any strain of the drive train component which would lead to effective running in. Therefore, these operation times remain unconsidered.

In further embodiments, the minimum value $B_{Min}$ is preset to be depending on the maximum value $B_{Max}$ or proportional to the maximum value $B_{Max}$. In these cases, there is an adaptation of the classification of a certain strain as to be relevant for running up to the yields already achieved by the wind energy plant since the drive train component has been started up. Through this, a strain which is particularly well adapted to the already reached run-in condition of the drive train component is obtained for the further run-in.

The wind energy plant of the present invention has at least one drive train component, an operation management, which can control at least one operational variable B significant for the strain of the drive train component to a desired value $B_S$, wherein the operation management has an equipment for establishing a yield value W, which describes the yield of the wind energy plant since starting up the drive train component, and an equipment for presetting a maximum value $B_{Max}$, depending on a yield value W, wherein the operation management can use the maximum value $B_{Max}$ for limiting the desired value $B_S$.

The wind energy plant of the present invention is particularly suited for the execution of the method of the present invention.

In the equipment for establishing the yield value W and in the equipment for presetting a maximum value $B_{Max}$, it can be matter in particular of suitable programs or program components which are executed on a control computer for the operation of the wind energy plant.

The present invention will be explained in more detail by means of an example of the realisation of the method depicted in a figure. In the example of realisation, the operational variable B significant for the strain of the drive train component is the electric power provided by the wind energy plant, which is designated with P in the following, as usual.

BRIEF DESCRIPTION OF THE DRAWING OF THE INVENTION

FIG. 1 shows a diagram concerning the dependency of the maximum value $B_{Max}$ of the power from the yield value W.

FIG. 2 is a block diagram of the inventive wind energy plant.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated On the abscissa of the coordinate system shown in FIG. 1, the yield value W is plotted. On the ordinate of the coordinate system, the electric power P provided by the wind energy plant is indicated. On the basis of the relation depicted in the diagram, one maximum value of the power $P_{Max}$ is assigned to every yield value W, which is used for the limitation of the desired value $P_S$ of the power. Further, one minimum value $P_{Min}$ is assigned to every yield value W, which represents a lower limit for a power to be classified as relevant for running in.

The curve for the maximum value $P_{Max}$ begins with a yield value W of 0 at an initial value $P_F$, which is about ⅕ of the also drawn in rated power $P_N$ of the wind energy plant. Irrespective of the already achieved power since starting up the drive train component, the desired value of the power $P_S$ is not limited to values below this always permitted power $P_F$. The maximum value $P_{Max}$ is constantly maintained on the value $P_F$ until a first yield value $W_1$ is reached Above the yield value $W_1$, there is an increase of the maximum value $P_{Max}$ proportional to the yield W, until the maximum value $P_{Max}$ reaches the rated value $P_N$ of the wind energy plant at the second yield value $W_2$. At this point of time, the run-in of the drive train component is completed and there is no further limitation of the electric power through the maximum value $P_{Max}$.

The curve indicating the minimum value $P_{Min}$ of the power to be classified as relevant for the run-in has values which are proportional to the maximum value $P_{Max}$. In the shown example, the minimum value $P_{Min}$ is always approximately 60 percent of the maximum value $B_{Max}$.

The yield values W represented in the diagram are calculated during running in as follows. There is a continuous measurement of the electric power P provided by the wind energy plant. In consecutive time intervals of 30 seconds duration, an average value of the provided electric power P is generated. Alternatively, a shifting (continuous) average value of the power values measured in every last 30 seconds may also be generated. When this average value is above that minimum value $P_{Min}$ which is assigned to the yield value W reached up to this point of time, the power generated in this time interval is classified as being relevant for running in. The average value of the power is multiplied by the interval, in order to establish they yield relevant for running in this time interval. The yield established in this way is added to the yield value reached up to this point of time. Thus, the yield value W is established, which takes into account only those yields of the electric power which were classified as being relevant for running in, which have in fact caused a strain of the drive train component which is relevant for running in.

FIG. 2 is a schematic drawing which shows the wind energy plant (1), the drive train component (2), the operation management (3), equipment for establishing a maximum value for the operational variable $B_{max}$ (4), equipment for establishing a yield variable W (5), and the generator (G).

As used herein, it should be understood that B refers to any operational variable which is significant for the strain of the drive train component, while P refers to the specific operational variable based on electrical power. Therefore, it should be understood that $B_N$ and $P_N$ refer to the nominal or rated value of the operational variable. $B_F$ and $P_F$ refer to the initial value of the operational variable. $B_S$ refers to the desired value of the operational variable.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for running in a drive train component of a wind energy plant, comprising the steps of: providing a wind energy plant having an operation management which can control at least one operational variable B significant for the strain of the drive train component to a desired value $B_s$, and limiting, after starting up the drive train component, the desired value $B_s$ by a maximum value $B_{max}$, which is preset depending on a yield value W which describes the yield of the wind energy plant achieved since starting up the drive train component.

2. A method according to claim 1, characterised in that one of the operational variables B significant for the strain of the drive train component is the electric power P generated by the wind energy plant.

3. A method according to claim 1, characterised in that one of the operational variables B significant for the strain of the drive train component is a torque in the drive train of the wind energy plant.

4. A method according to claim 1, characterised in that the maximum value $B_{Max}$ is steadily increased after starting up, until it reaches a rated value $B_N$ of the operational variable B of the wind energy plant significant for the strain of the drive train component at a certain yield value $W_2$.

5. A method according to claim 1, characterised in that running in is stopped when a certain yield value is reached.

6. A method according to claim 1, characterised in that the maximum value $B_{Max}$ has an initial value $B_F$ when the drive train component is started up.

7. A method according to claim 1, characterised in that the maximum value $B_{Max}$ is kept constant up to a presettable yield value $W_1$ after starting up the drive train component.

8. A method according to claim 1, characterised in that the maximum value $B_{Max}$ is preset to be proportional to the yield value W in a period.

9. A method according to claim 1, characterised in that the maximum value $B_{Max}$ is preset to be proportional to a root of the yield value W in a period.

10. A method according to claim 8, characterised in that the maximum value $B_{Max}$ is preset to be proportional to the yield value W or proportional to the square root of the yield value W, respectively, between the yield values $W_1$ and $W_2$.

11. A method according to claim 1, characterised in that the yield value W is established by cumulation of the achieved yields of the wind energy plant since the drive train component was started up.

12. A method according to claim 11, characterised in that in the cumulation of the achieved yields only those yields are taken into account which have been achieved at a momentary or average value of the of the operational variable B significant for the strain of the drive train component above a minimum value $B_{Min}$.

13. A method according to claim 12, characterised in that the minimum value $B_{Min}$ is preset depending on the maximum value $B_{Max}$.

14. A method according to claim 13, characterised in that the minimum value $B_{Min}$ is preset to be proportional to the maximum value $B_{Max}$.

15. A wind energy plant with at least one drive train component, an operation management, which can control at least one operational variable B significant for the strain of the drive train component to a desired value $B_S$, wherein the operation management has an equipment for establishing a yield value W, which describes the yield of the wind energy plant achieved since starting up the drive train component, and an equipment for presetting a maximum value $B_{Max}$, depending on a yield value W, wherein the operation management can use the maximum value $B_{Max}$ for limiting the desired value $B_S$.

16. A wind energy plant according to claim 15, characterised in that one of the operational variables B of the wind energy plant significant for the strain of the drive train component is the electric power generated by the wind energy plant.

17. A wind energy plant according to claim 15, characterised in that one of the operational variables B of the wind energy plant significant for the strain of the drive train component is a torque in the drive train of the wind energy plant.

18. A wind energy plant according to claim 15, characterised in that the equipment for presetting a maximum value $B_{Max}$ can steadily increase the maximum value $B_{Max}$ after starting up, until it reaches a rated value $B_N$ of the operational variable B of the wind energy plant significant for the strain of the drive train component at a certain yield value $W_2$.

19. A wind energy plant according to claim 15, characterised in that the operation management can stop the limitation of the desired value $B_S$ when the equipment for determining a yield value W establishes a yield value W of a certain amount.

20. A wind energy plant according to claim 15, characterised in that there is an equipment for presetting an initial value $B_F$ and the equipment for presetting a maximum value $B_{Max}$ can use the preset initial value $B_F$ for presetting the maximum value $B_{Max}$ in the point of time when the drive train component is started up.

21. A wind energy plant according to claim 15, characterised in that the equipment for presetting a maximum value $B_{Max}$ can keep the maximum value $B_{Max}$ constant up to a presettable yield value $W_1$ after the drive train component was started up.

22. A wind energy plant according to claim 15, characterised in that the equipment for presetting a maximum value $B_{Max}$ can preset the maximum value $B_{Max}$ to be proportional to the yield value W in a period.

23. A wind energy plant according to claim 15, characterised in that the equipment for presetting a maximum value $B_{Max}$ can preset the maximum value $B_{Max}$ to be proportional to a root of the yield value W in a period.

24. A wind energy plant according to claim 22, characterised in that the equipment for presetting a maximum value $B_{Max}$ can preset the maximum value $B_{Max}$ to be proportional to the yield value W or proportional to the square root of the yield value W, respectively, between the yield values $W_1$ and $W_2$.

25. A wind energy plant according to claim 15, characterised in that the equipment for establishing a yield value W can establish the yield value W by cumulation of the achieved yields of the wind energy plant since the drive train component was started up.

26. A wind energy plant according to claim 25, characterised in that when cumulating the achieved yields, the equipment for establishing a yield value W can selectively take into account only those yields which have been achieved at a momentary or average value of the of the operational variable B significant for the strain of the drive train component above a minimum value $B_{Min}$.

27. A wind energy plant according to claim 26, characterised in that there is an equipment for presetting the minimum value $B_{Min}$, which can preset the $B_{Min}$ depending on the maximum value $B_{Max}$.

28. A wind energy plant according to claim 27, characterised in that the equipment for presetting the minimum value $B_{Min}$ can preset the minimum value $B_{Min}$ to be proportional to the maximum value $B_{Max}$.

* * * * *